United States Patent
Yin et al.

(10) Patent No.: US 10,018,769 B2
(45) Date of Patent: Jul. 10, 2018

(54) LIGHT GUIDE PLATE AND METHOD OF PRODUCING THE SAME

(71) Applicants: BOE Technology Group Co., Ltd., Beijing (CN); Beijing BOE Optoelectronics Technology Co., Ltd., Beijing (CN)

(72) Inventors: Qingping Yin, Beijing (CN); Ruijun Dong, Beijing (CN); Tingting Zhao, Beijing (CN); Caizheng Zhang, Beijing (CN); Hai Kang, Beijing (CN); Xuerong Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/252,386

(22) Filed: Aug. 31, 2016

(65) Prior Publication Data
US 2017/0285250 A1   Oct. 5, 2017

(30) Foreign Application Priority Data

Mar. 31, 2016   (CN) .......................... 2016 1 0202034

(51) Int. Cl.
*F21V 8/00* (2006.01)
(52) U.S. Cl.
CPC ........... *G02B 6/0065* (2013.01); *G02B 6/002* (2013.01); *G02B 6/0018* (2013.01)
(58) Field of Classification Search
CPC ..... G02B 6/0065; G02B 6/0018; G02B 6/002
See application file for complete search history.

(56) References Cited

U.S. PATENT DOCUMENTS

| 8,939,633 B2 | 1/2015 | Yabe et al. |
| 9,086,595 B2 | 7/2015 | Takemura et al. |
| 2014/0176860 A1* | 6/2014 | Tseng ..................... G02B 6/002 349/62 |

FOREIGN PATENT DOCUMENTS

| CN | 201035175 Y | 3/2008 |
| CN | 102313174 A | 1/2012 |

(Continued)

OTHER PUBLICATIONS

First Office Action, including Search Report, for Chinese Patent Application No. 201610202034.8, dated Mar. 23, 2018, 11 pages.

*Primary Examiner* — Thomas M Sember
(74) *Attorney, Agent, or Firm* — Westman, Champlin & Koehler, P.A.

(57) ABSTRACT

The present disclosure relates to a field of display technology and discloses a light guide plate and a method of producing the same. The light guide plate includes a body having a surface which forms an incident surface, an exit surface and a slope, wherein the incident surface is perpendicular to the exit surface, and the incident surface and the exit surface are connected by the slope, wherein in a direction perpendicular to the incident surface and from the incident surface towards the exit surface, thickness of location of the light guide plate where the slope is formed is gradually reduced, and wherein the slope is provided with a light guide component for guiding the light that is emitted towards the slope towards an area inside the light guide plate that corresponds to the exit surface.

6 Claims, 4 Drawing Sheets

(56) References Cited

FOREIGN PATENT DOCUMENTS

| CN | 104949011 A | 9/2015 |
|----|-------------|--------|
| JP | 2014-82173 A | 5/2014 |
| TW | 201426126 A | 7/2014 |

* cited by examiner

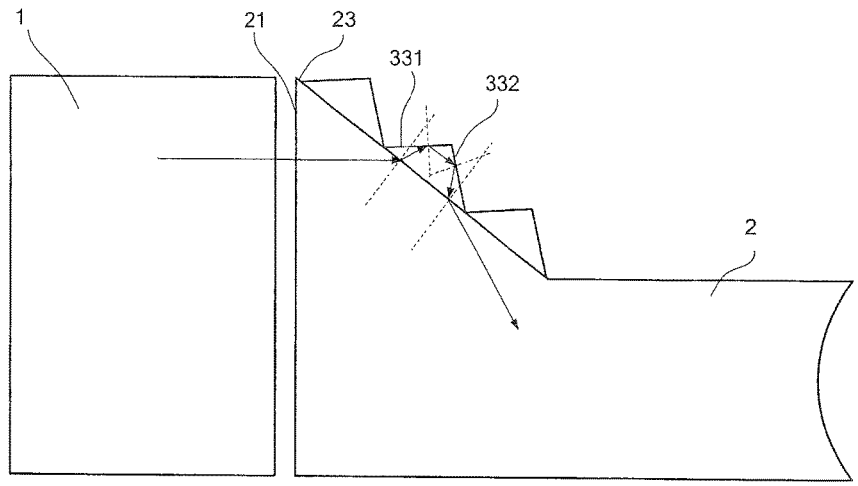

Fig. 5b

| forming a body of the light guide plate, the body having a surface which forms an incident surface, an exit surface and a slope, wherein the incident surface is perpendicular to the exit surface and the incident surface and the exit surface are connected by the slope, and wherein in a direction perpendicular to the incident surface and from the incident surface towards the exit surface, a location of the light guide plate where the slope is formed has a thickness that is gradually reduced | S601 |
|---|---|
| providing on the slope a light guide component for guiding the light that is emitted towards the slope towards an area inside the light guide plate that corresponds to the exit surface | S602 |

Fig. 6

LIGHT GUIDE PLATE AND METHOD OF PRODUCING THE SAME

CROSS-REFERENCE TO RELATED APPLICATIONS

This application claims the benefit of the Chinese Patent Application No. 201610202034.8 filed on Mar. 31, 2016 in the State Intellectual Property Office of China, entitled with "Light Guide Plate and Method of Producing the Same", the whole disclosure of which is incorporated herein by reference.

FIELD OF THE INVENTION

The present disclosure relates to a field of display technology, and particularly to a light guide plate and a method of producing the same.

DESCRIPTION OF THE RELATED ART

With market requirements for ultra-thin electronic display device in the field of display technology, reduction of thickness of the display device can be achieved by thinning a backlight module. In the backlight module, the speed of thinning the light guide plate is faster than the speed of thinning a light source. The light source may be LED. In order to achieve the reduction of the thickness of the backlight module while making good use of light efficiency, in an existing backlight module, a bell mouth structure is formed at incident surface of the light guide plate. That is, thickness of a location of the light guide plate where the incident surface is formed is larger than thickness of a location of the light guide plate where the effective display area is located. As shown in FIG. 1, the light source 01 is disposed on a side of the incident surface 021 of the light guide plate 02 and a slope 023 is formed between the incident surface 021 of the light guide plate 02 and the exit surface 022 of the light guide plate 02. An angle formed between the slope 023 and the exit surface 022 is greater than 90° and less than 180°.

However, as shown in FIG. 1, after the light generated from the light source 01 enter the light guide plate 02 through the incident surface 021, a portion of the light will be irradiated on the slope 023 formed between the incident surface 021 and the exit surface 022. A portion of the light irradiated on the slope 023 will pass through the slope 023 of the light guide plate 02 and thus out of the light guide plate 02 and be lost, such as light A, resulting in that the backlight module may not make use of the light energy of the light source 01 effectively. Therefore, the brightness of the backlight module is low and the image quality is poor. Thus, it is particularly important to design a light guide plate that can reduce loss of light energy.

SUMMARY OF THE INVENTION

The present disclosure provides the following technical solutions:

A light guide plate includes a body having a surface which forms an incident surface, an exit surface and a slope, wherein the incident surface is perpendicular to the exit surface, and the incident surface and the exit surface are connected by the slope, wherein in a direction perpendicular to the incident surface and from the incident surface towards the exit surface, a location of the light guide plate where the slope is formed has a thickness that is gradually reduced, and wherein the slope is provided with a light guide component for guiding the light that is emitted towards the slope towards an area inside the light guide plate that corresponds to the exit surface.

A method of producing any one of the light guide plates according to the above technical solutions includes:

forming a body of the light guide plate, the body having a surface which forms an incident surface, an exit surface and a slope, wherein the incident surface is perpendicular to the exit surface, and the incident surface and the exit surface are connected by the slope, and wherein in a direction perpendicular to the incident surface and from the incident surface towards the exit surface, a location of the light guide plate where the slope is formed has a thickness that is gradually reduced, and providing on the slope a light guide component for guiding the light that is emitted towards the slope towards an area inside the light guide plate that corresponds to the exit surface.

BRIEF DESCRIPTION OF THE DRAWINGS

FIG. 3b is a schematic view of an optical path of the light guide plate in FIG. 3a;

FIG. 4b is a schematic view of an optical path of the light guide plate in FIG. 4a;

FIG. 5b is a schematic view of an optical path of the light guide plate in FIG. 5a;

FIG. 6 is a flowchart of a method of producing a light guide plate according to the disclosure.

DETAILED DESCRIPTION OF EMBODIMENTS

Figure 1:
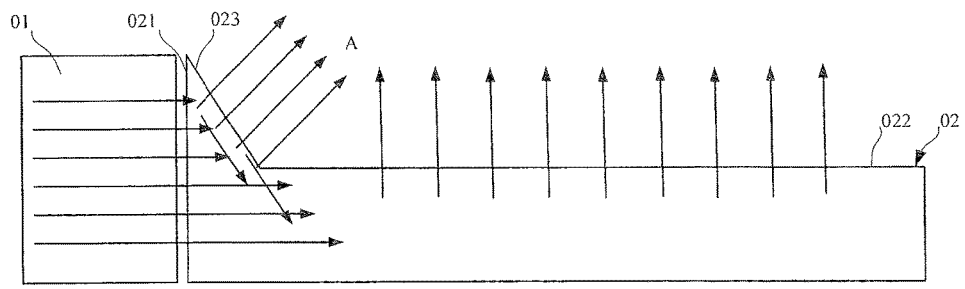
FIG. 1 is a schematic view of operation of a light guide plate in the prior art.

The technical solutions according to embodiments of the present invention will now be clearly and completely described in conjunction with the accompanying drawings according to embodiments of the present invention. It is clear that the described embodiments are merely a part of the embodiments of the present invention, but not all the embodiments. Based on the embodiments of the present invention, all other embodiments that can be arrived at by those with ordinary skills in the art without any creative efforts will fall within the protection scope of the present disclosure.

The present disclosure provides a light guide plate and a method of producing the same, which can reduce loss of lights at a slope of bell mouth structure that are introduced from the light source into light guide plate through the incident surface, improve utilization efficiency of the light energy from the light source for the backlight module and improve brightness of the backlight module.

To achieve the above object, the present disclosure provides the following technical solutions:

A light guide plate includes a body having a surface which forms an incident surface, an exit surface and a slope, wherein the incident surface is perpendicular to the exit surface, the incident surface and the exit surface are connected by the slope, wherein in a direction perpendicular to the incident surface and from the incident surface towards the exit surface, a location of the light guide plate where the slope is formed has a thickness that is gradually reduced, and wherein the slope is provided with a light guide component for guiding the light that is emitted towards the slope towards an area inside the light guide plate that corresponds to the exit surface.

In the above light guide plate, the light guide component disposed on the slope may guide at least a portion of the light that may be originally emitted out of the slope towards an area inside the light guide plate that corresponds to the exit surface, thereby enabling the portion of the light to reach a position where the light guide plate directly faces an effective display area of a display panel. Therefore, the structure of the above light guide plate reduces the proportion of light emitted by the light source that passes through the slope of the light guide plate and out of the light guide plate, thereby reducing the loss of the light and improving the utilization efficiency of the light energy from the light source. On the other hand, the light passing through the slope is reduced such that amount of the light guided out of the exit surface increases, thus improving the brightness of the backlight module.

Thus, the above light guide plate can reduce the loss of light at a slope of bell mouth structure that is introduced from light source into light guide plate through the incident surface, improve utilization efficiency of the light energy from the light source for the backlight module and improve brightness of the backlight module.

In an example, the light guide component includes a reflective layer made of reflective material.

In an example, material of the reflective layer is aluminum.

In an example, the light guide component includes a plurality of mesh dots that are formed on the slope.

In an example, the light guide component includes a plurality of microstructure prisms formed on the slope.

In an example, material of the microstructure prisms is white resin material.

In an example, an angle formed between the slope and the incident surface is greater than 43° and less than 90°.

A method of producing any one of the light guide plates according to the above technical solutions includes:

forming a body of the light guide plate, the body having a surface which forms an incident surface, an exit surface and a slope, wherein the incident surface is perpendicular to the exit surface, and the incident surface and the exit surface are connected by the slope, and wherein in a direction perpendicular to the incident surface and from the incident surface towards the exit surface, a location of the light guide plate where the slope is formed has a thickness that is gradually reduced, and providing on the slope a light guide component for guiding the light that is emitted towards the slope towards an area inside the light guide plate that corresponds to the exit surface.

In an example, providing on the slope a light guide component for guiding the light that is emitted towards the slope towards an area inside the light guide plate that corresponds to the exit surface includes:

forming the reflective layer made of reflective material on the slope by a coating or transferring process.

In an example, providing on the slope a light guide component for guiding the light that is emitted towards the slope towards an area inside the light guide plate that corresponds to the exit surface includes:

covering the slope with a mold for forming a plurality of mesh dots; and forming the mesh dots on the slope by laser or hot-pressing.

In an example, providing on the slope a light guide component for guiding the light that is emitted towards the slope towards an area inside the light guide plate that corresponds to the exit surface includes:

covering the slope with a soft film for forming a plurality of microstructure prisms, and dropping UV-curable glue into the soft film; and removing the soft film after UV-curable glue is cured by means of a UV lamp.

Figure 2:
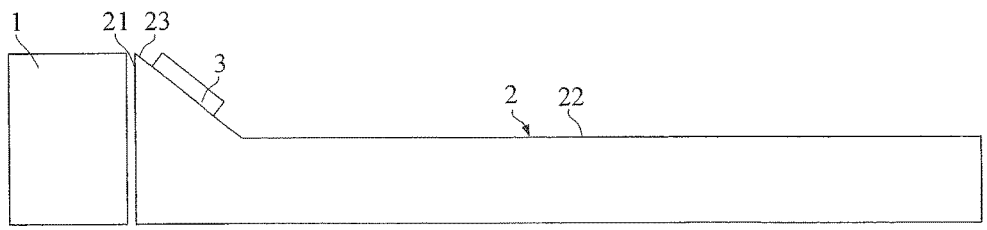
FIG. 2 is a schematic view of operation of a light guide plate according to the present disclosure.

As shown in FIG. 2, a light guide plate includes a body 2 having a surface which forms an incident surface 21, an exit surface 22 and a slope 23. The incident surface 21 is perpendicular to the exit surface 22, and the incident surface 21 and the exit surface 22 are connected by the slope 23. In a direction perpendicular to the incident surface 21 and from the incident surface 21 towards the exit surface 22, a location of the light guide plate where the slope 23 is formed has a thickness that is gradually reduced. The slope 23 is provided with a light guide component 3 for guiding the light that is emitted towards the slope 23 towards an area inside the light guide plate that corresponds to the exit surface.

In the above light guide plate, the light guide component disposed on the slope 23 may guide at least a portion of the light that may originally be emitted out of the slope 23 towards an area inside the light guide plate that corresponds to the exit surface, thereby enabling the portion of the light to reach a position where the light guide plate directly faces an effective display area of a display panel. Therefore, the structure of the above light guide plate reduces the proportion of light that passes through the slope 23 of the light guide plate and out of the light guide plate to the light emitted by the light source, thereby reducing the loss of the light and improving the utilization efficiency of the light energy from the light source. On the other hand, the lights passing through the slope 23 is reduced such that amount of the light guided out of the exit surface 22 increases, thus improving the brightness of the backlight module.

Thus, the above light guide plate can reduce the loss of light at a slope 23 of bell mouth structure that is introduced from the light source into the light guide plate through the incident surface 21, improve utilization efficiency of the light energy from the light source for the backlight module and improve brightness of the backlight module.

Figure 3A:
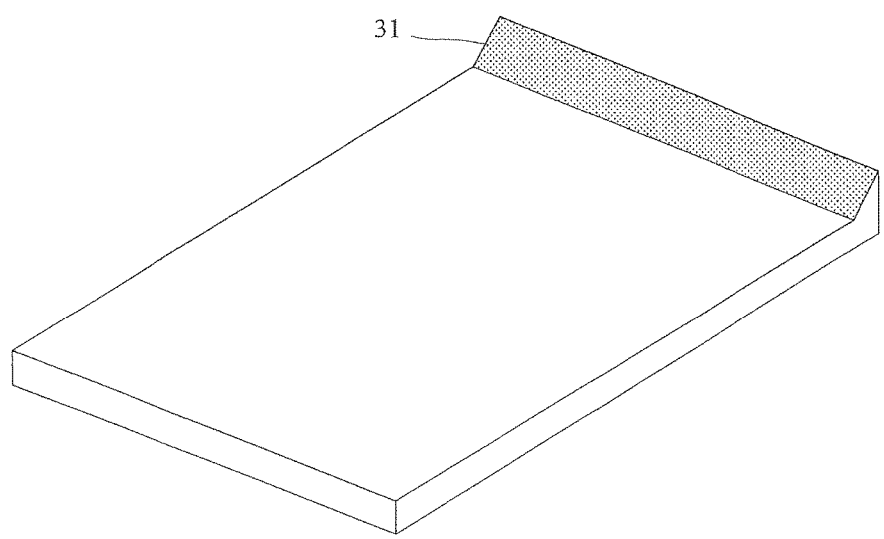
FIG. 3a is a structural schematic view of a light guide plate according to the present disclosure.
Figure 3B:
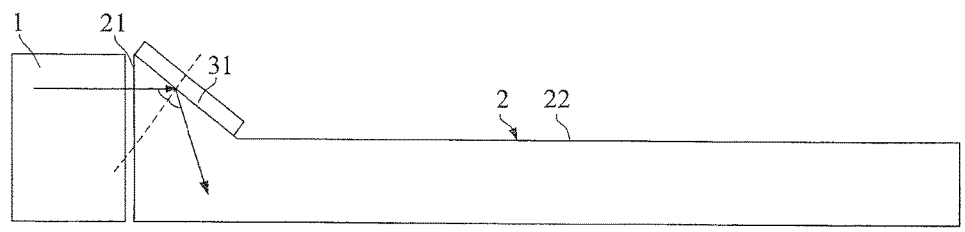

In order to guide the light that is emitted towards the slope 23 towards an area inside the light guide plate that corresponds to the exit surface, in an embodiment, as shown in FIGS. 3a and 3b, the light guide component 3 is a reflective layer 31 made of reflective material. When there is no such a light guide component 3 on the slope 23, the light irradiated on the slope 23 will be directly emitted through the slope 23. When a reflective layer 31 made of reflective material is provided on the slope 31, as shown in FIG. 3b, the light irradiated on the slope 23 will be reflected by the reflective layer 31, which results in that propagation direction of the light changes, and return back into the light guide plate. Therefore, the reflective layer 31 made of reflective material may guide at least a portion of the lights that may be originally emitted out of the slope 23 towards an area inside the light guide plate that corresponds to the exit surface.

Specifically, the material of the reflective layer 31 may be aluminum. Since reflective coefficient of aluminum is large and the optical properties of aluminum are stable, aluminum is usually used to produce a reflective layer 31 for visible light and the reflectivity of the reflective layer 31 in which aluminum is used as a reflective material is high. According to actual requirements, material of the reflective layer 31 can also be chosen from other metallic materials or dielectric materials.

Figure 4A:
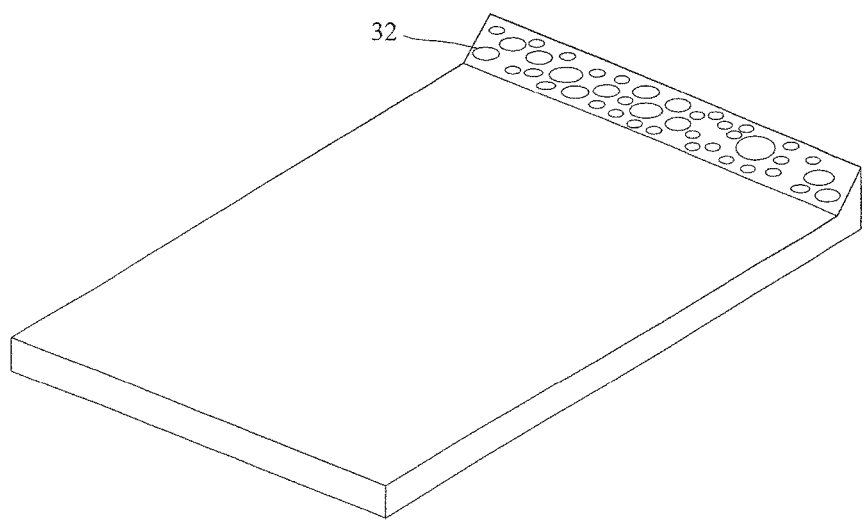
FIG. 4a is another structural schematic view of a light guide plate according to the present disclosure.
Figure 4B:
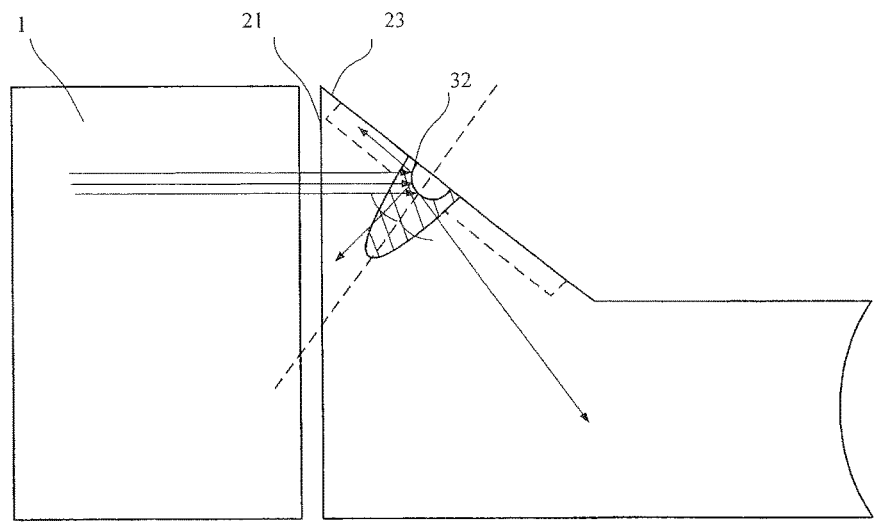

In order to guide the light which is emitted towards the slope 23 towards an area inside the light guide plate that corresponds to the exit surface, in an embodiment, as shown in FIGS. 4a and 4b, the light guide component 3 includes a plurality of mesh dots 32 formed on the slope 23. When such a light guide component 3 is not provided on the slope 23, the light irradiated on the slope 23 will be directly emitted through the slope 23. When the mesh dots 32 are provided on the slope 23, as shown in FIG. 4b, since the mesh dots 32 form an irregular surface, the parallel light irradiated on the mesh dots 32 is scattered at the mesh dots 32, which results in that propagation direction of the light changes, and at least a portion of the light returns into the light guide plate. Therefore, the slope 23 having the mesh dots 32 may guide at least a portion of the light that may be originally emitted out of the slope 23 towards an area inside the light guide plate that corresponds to the exit surface.

Figure 5A:
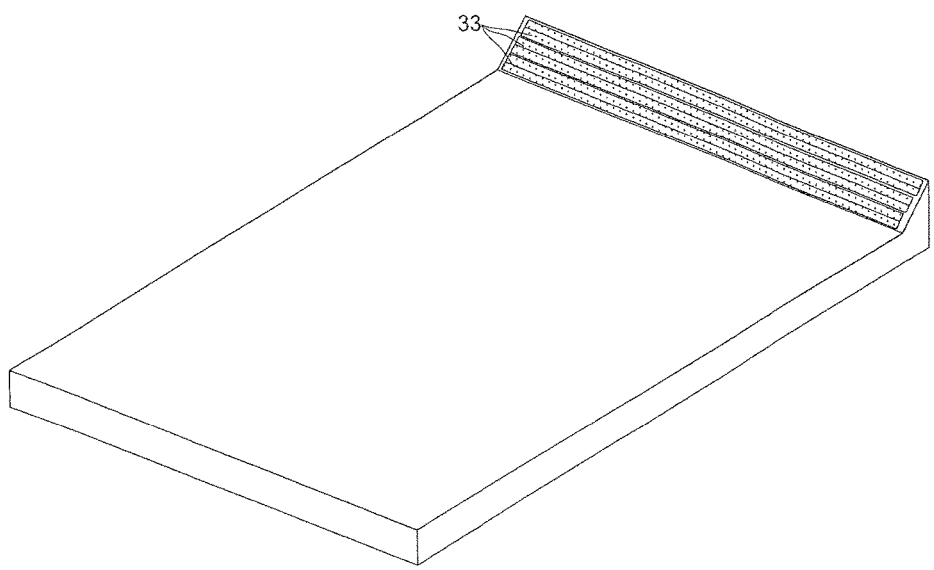
FIG. 5a is another structural schematic view of a light guide plate according to the present disclosure.

In order to guide the light which is emitted towards the slope 23 towards an area inside the light guide plate that corresponds to the exit surface, in an embodiment, as shown in FIGS. 5a and 5b, the light guide component 3 includes a plurality of microstructure prisms 33 formed on the slope 23. When such a light guide component 3 is not provided on the slope 23, the light irradiated on the slope 23 will be directly emitted through the slope 23. When a plurality of microstructure prisms 33 are provided on the slope 23, the light irradiated on the plurality of microstructure prisms 33 is reflected and refracted at the plurality of microstructure prisms 33, as shown in FIG. 5b. Since the refraction index of the prism is larger than that of the light guide plate, the light will be refracted when passing through the slope 23 and the light will be deflected towards the normal line. When being irradiated on the prism surface 331, the light will be totally reflected and be emitted towards another surface 332 of the prism and be totally reflected at the another surface 332. The light is refracted when passing through the slope 23, the light is deflected off the normal line and propagation direction of the light changes after the light passes through the microstructure prisms 33, such that at least a portion of the light returns into the light guide plate. Therefore, by providing the plurality of microstructure prisms 33 on the slope 23, at least a portion of the light that may be originally emitted out of the slope 23 may be guided towards an area inside the light guide plate that corresponds to the exit surface.

Specifically, the material of the microstructure prisms 33 may be white resin material. The white resin material has good viscosity, is usually used as binder and to produce components and is a material that can be easily obtained. The process of producing microstructure prisms 33 with white resin material is simple and the cost is low. According to actual requirements, the microstructure prisms 33 may be produced by other materials.

In an embodiment, an angle A formed between the slope 23 and the incident surface 21 is greater than 43° and less than 90°. The angle A formed between the slope 23 and the incident surface 21 is greater than an incident angle that is critical when a total reflection for the light occurs on the light guide plate. When the refractive index of the light guide plate is 1.49, the incident angle that is critical when a total reflection for the light occurs on the light guide plate is 43° and the angle A formed between the slope 23 and the incident surface 21 is greater than 43°. The specific angle can be chosen depending on the actual requirements of the light guide plate.

As shown in FIG. 6, a method of producing any one of the light guide plates according to the above technical solutions includes:

step S601 of forming a body 2 of the light guide plate having a surface which forms an incident surface 21, an exit surface 22 and a slope 23, wherein the incident surface 21 is perpendicular to the exit surface 22, and the incident surface 21 and the exit surface 22 are connected by the slope 23, and wherein in a direction perpendicular to the incident surface 21 and from the incident surface 21 towards the exit surface 22, a location of the light guide plate where the slope is formed has a thickness that is gradually reduced, and step S602 of providing on the slope 23 a light guide component 3 for guiding the light that is emitted towards the slope 23 towards an area inside the light guide plate that corresponds to the exit surface.

In the method of producing the light guide plate, by providing light guide component 3 on the slope 23 of the light guide plate, the utilization efficiency of the light energy from the light source and the brightness of the backlight module can be improved. In particular, a bell mouth structure with a slope 23 is formed in step S601, and then a light guide component is provided in step S602 such that the light that is emitted towards the slope 23 from the inside of the light guide plate is guided towards an area inside the light guide plate that corresponds to the exit surface.

In an embodiment, providing on the slope 23 a light guide component 3 for guiding the light that is emitted towards the slope 23 towards an area inside the light guide plate that corresponds to the exit surface includes:

forming the reflective layer 31 made of reflective material on the slope 23 by a coating or transferring process.

The reflective layer 31 made of reflective material can guide the light that is emitted towards the slope 23 towards an area inside the light guide plate that corresponds to the exit surface and improve the utilization efficiency of the light energy from the light source and the brightness of the backlight module. A uniform reflective layer 31 can be formed on the slope 23 by a coating or transferring process which is simple and of low cost. By forming the reflective layer 31 on the slope 23 of the light guide plate, the utilization efficiency of the light energy from the light source and the brightness of the backlight module will be improved.

In another embodiment, providing on the slope 23 a light guide component 3 for guiding the light that is emitted towards the slope 23 towards an area inside the light guide plate that corresponds to the exit surface includes:

covering the slope 23 with a mold for forming a plurality of mesh dots 32; and forming the mesh dots 32 on the slope 23 by laser or hot-pressing.

Laser or hot-pressing is usually used to produce the mesh dots 32 of the light guide plate. A suitable mold for mesh dots 32 can be chosen according to the actual requirements and is provided on the slope 23. Then the mesh dots 32 can be formed on the slope 23 by laser or hot-pressing. By forming the mesh dots 32 on the slope 23 of the light guide plate, the utilization efficiency of the light energy from the light source and the brightness of the backlight module will be improved.

In another embodiment, providing on the slope 23 a light guide component 3 for guiding the light that is emitted towards the slope 23 towards an area inside the light guide plate that corresponds to the exit surface includes:

covering the slope 23 with a soft film for forming a plurality of microstructure prisms 33, and dropping UV-curable glue into the soft film; and removing the soft film after UV-curable glue is cured by means of a UV lamp.

In another embodiment, providing on the slope 23 a light guide component 3 for guiding the light that is emitted towards the slope 23 towards an area inside the light guide plate that corresponds to the exit surface includes:

covering the slope 23 with a soft film for forming a plurality of microstructure prisms 33;

coating white resin glue; and removing the soft film after white resin glue is cured by means of a UV lamp.

Then the microstructure prisms 33 similar to the structure of prism sheet are formed.

By providing a plurality of microstructure prisms 33 on the slope 23 of the light guide plate, the utilization efficiency of the light energy from the light source and the brightness of the backlight module will be improved.

Obviously, various modifications and variations can be made to the embodiments of the present invention by those skilled in the art without departing from the spirit and scope of the disclosure. Thus, if these modifications and variations to the present disclosure belong to the scope of the claims of the disclosure or its equivalents, the present disclosure is further intended to encompass such modifications and variations.

What is claimed is:

1. A method of producing a light guide plate, comprising:
    forming a body of the light guide plate, the body having a surface which forms an incident surface, an exit surface and a slope, wherein the incident surface is perpendicular to the exit surface and the incident surface and the exit surface are connected by the slope, and wherein in a direction perpendicular to the incident surface and from the incident surface towards the exit surface, a location of the light guide plate where the slope is formed has a thickness that is gradually reduced, and
    providing on the slope a light guide component for guiding the light that is emitted towards the slope towards an area inside the light guide plate that corresponds to the exit surface,
    wherein providing on the slope a light guide component for guiding the light that is emitted towards the slope towards an area inside the light guide plate that corresponds to the exit surface comprises:
        covering the slope with a mold for forming a plurality of mesh dots; and
        forming the mesh dots on the slope by laser or hot-pressing.

2. The method according to claim 1, wherein an angle formed between the slope and the incident surface is greater than 43° and less than 90°.

3. A method of producing a light guide plate, comprising:
    forming a body of the light guide plate, the body having a surface which forms an incident surface, an exit surface and a slope, wherein the incident surface is perpendicular to the exit surface and the incident surface and the exit surface are connected by the slope, and wherein in a direction perpendicular to the incident surface and from the incident surface towards the exit surface, a location of the light guide plate where the slope is formed has a thickness that is gradually reduced, and
    providing on the slope a light guide component for guiding the light that is emitted towards the slope towards an area inside the light guide plate that corresponds to the exit surface,
    wherein providing on the slope a light guide component for guiding the light that is emitted towards the slope towards an area inside the light guide plate that corresponds to the exit surface comprises:
        covering the slope with a soft film for forming a plurality of microstructure prisms, and dropping UV-curable glue into the soft film; and
        removing the soft film after the UV-curable glue is cured by means of a UV lamp.

4. The method according to claim 3, wherein an angle formed between the slope and the incident surface is greater than 43° and less than 90°.

5. A method of producing a light guide plate, comprising:
    forming a body of the light guide plate, the body having a surface which forms an incident surface, an exit surface and a slope, wherein the incident surface is perpendicular to the exit surface and the incident surface and the exit surface are connected by the slope, and wherein in a direction perpendicular to the incident surface and from the incident surface towards the exit surface, a location of the light guide plate where the slope is formed has a thickness that is gradually reduced, and
    providing on the slope a light guide component for guiding the light that is emitted towards the slope towards an area inside the light guide plate that corresponds to the exit surface,
    wherein providing on the slope a light guide component for guiding the light that is emitted towards the slope towards an area inside the light guide plate that corresponds to the exit surface comprises:
        covering the slope with a soft film for forming a plurality of microstructure prisms;
        coating white resin glue; and
        removing the soft film after the white resin glue is cured by means of a UV lamp.

6. The method according to claim 5, wherein an angle formed between the slope and the incident surface is greater than 43° and less than 90°.

* * * * *